No. 637,232. Patented Nov. 21, 1899.
J. BUTCHER.
AUTOMATIC FIRE EXTINGUISHER.
(Application filed Jan. 12, 1899.)
(No Model.) 2 Sheets—Sheet 2.
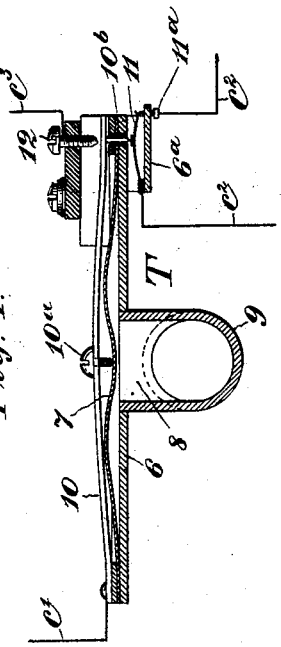
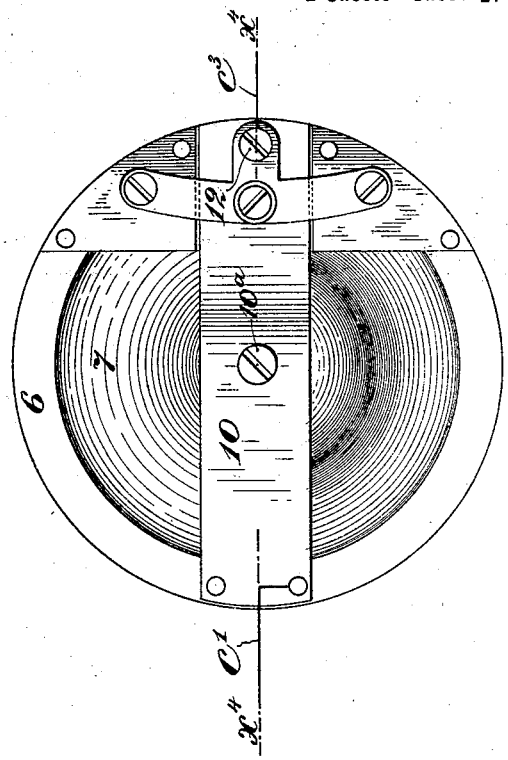
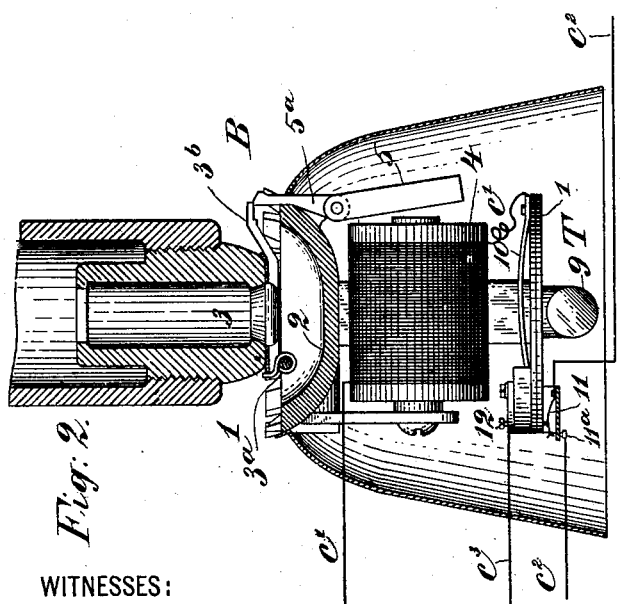
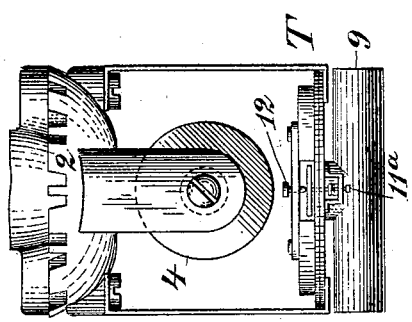
WITNESSES: INVENTOR
Joseph Butcher
BY
ATTORNEY

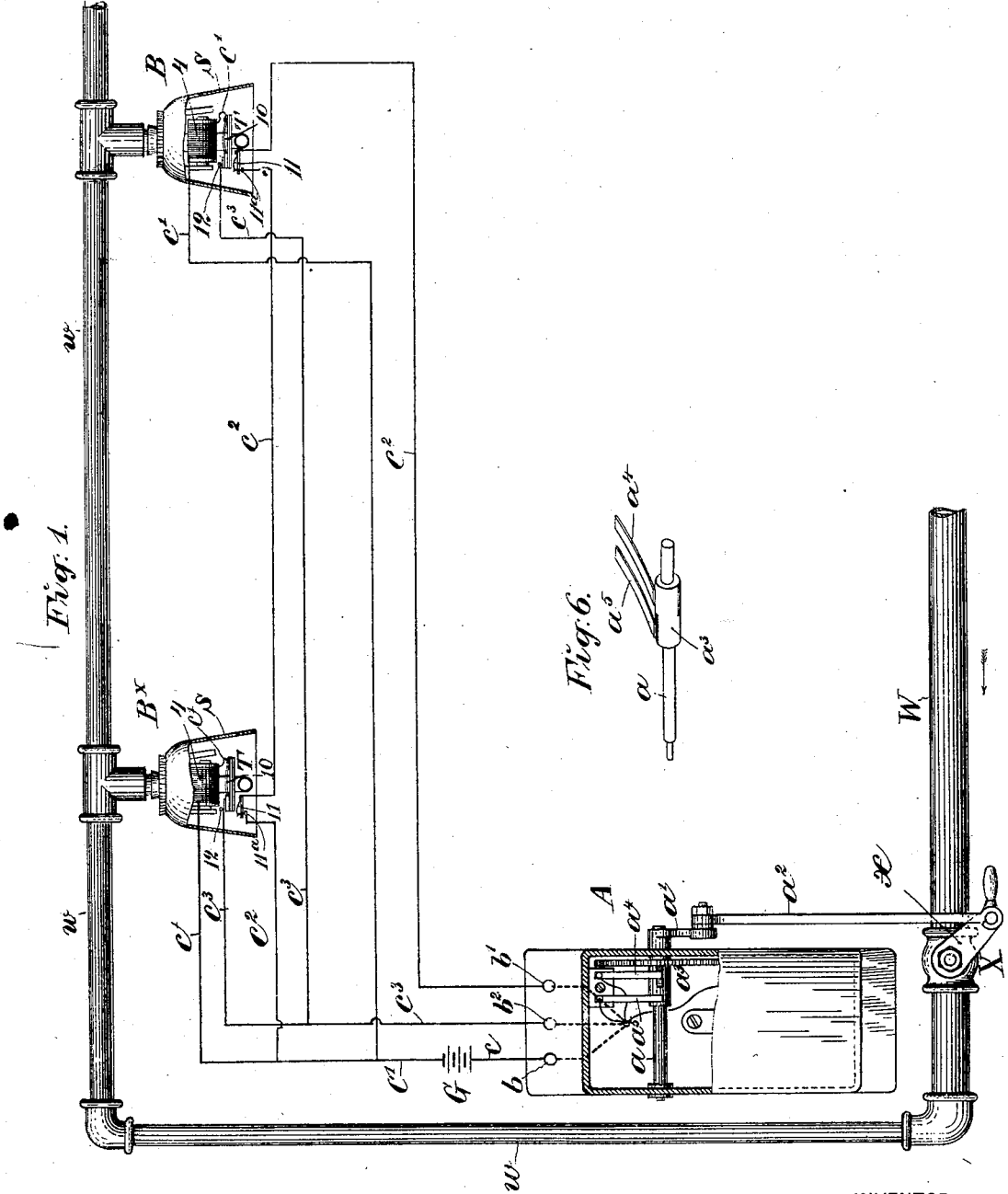

UNITED STATES PATENT OFFICE.

JOSEPH BUTCHER, OF JERSEY CITY, NEW JERSEY.

AUTOMATIC FIRE-EXTINGUISHER.

SPECIFICATION forming part of Letters Patent No. 637,232, dated November 21, 1899.

Application filed January 12, 1899. Serial No. 701,895. (No model.)

*To all whom it may concern:*

Be it known that I, JOSEPH BUTCHER, a citizen of the United States, residing at Jersey City, Hudson county, New Jersey, have invented certain new and useful Improvements in Automatic Fire-Extinguishers, of which the following is a specification.

This invention relates to means adapted for turning on water automatically when the temperature of a room where the apparatus is placed rises above a predetermined degree, and a thermostat is provided which when the temperature reaches the predetermined maximum acts to close an electric circuit through an electric motor of a known kind. This motor opens the cock in the water-service pipe and allows the water to flow to the discharging-point. At the same time the circuit is closed through an electromagnet which releases a valve at the discharging-point and allows the valve to open and the water to flow and extinguish the fire. When the temperature falls at the thermostat, the "opening" branch of the electric circuit will be broken and the "closing" branch of the circuit closed, whereby the electric motor will be set in motion to close the cock in the water-service pipe and shut off the water.

In the drawings which serve to illustrate the invention, Figure 1 is a somewhat diagrammatic view showing the installation with two discharging-nozzles, a motor, a generator, and the circuits. Fig. 2 is a sectional view, on a larger scale, illustrating the discharge nozzle and valve, the valve-releasing magnet, and the thermostat. Fig. 3 is a view from the left in Fig. 2. Fig. 4 is a section of the thermostat at line $x^4$ in Fig. 5, and this latter figure is a plan view of the thermostat. These views are drawn to a larger scale than Figs. 2 and 3 for purposes of illustration. Fig. 6 is a detached view of the circuit-changer and brushes, showing the blocks of insulating material.

Referring first to Fig. 1, W represents the main water-service pipe in a building, and $w$ a branch therefrom leading to a suite of rooms, for example, in the building. In the pipe W is a cut-off cock X, adapted to be opened and closed by an electric motor A. As this general form of motor is known and a motor of this particular construction is illustrated and described in my pending application, Serial No. 694,247, filed October 22, 1898, it will only be necessary to say here that it comprises an electromagnet, the armature thereof carrying a pawl which imparts a step-by-step rotation to a ratchet-wheel as the armature vibrates. The rotation of the ratchet-wheel is communicated through suitable gearing to a crank-shaft $a$, the crank $a'$ on which is coupled by a rod $a^2$ to an arm $x$ on the spindle or plug of the cock X. A half-rotation of the crank $a'$ opens the cock X and the next half-rotation closes the cock. B B$^\times$ are like devices at the respective discharging-points in the pipe $w$. There may be any number of these devices, such as B, situated at any points desired; but only two are shown herein. Each device B (see Figs. 2 and 3) comprises a nozzle 1, coupled to the pipe $x$ and carrying a spray-cup 2. Such spray-cups are known in fire-extinguishing devices, and no claim is made to them nor is this invention limited to their use. At the end or outlet of the nozzle 1 is a hinged closing-valve 3, which has a light spring $3^a$ at the hinge, tending to hold the valve up to its seat. Carried by the nozzle is an electromagnetic valve-releasing device, which comprises an electromagnet 4, the armature 5 of which has a toe $5^a$, which takes under the valve 3 normally and holds it up to its seat. When the magnet is excited, it attracts its armature, withdraws the toe $5^a$ from under an arm $3^b$ on the valve, and allows the latter to open. A thermostat T is also carried by the nozzle or situated adjacent thereto. This thermostat will now be described more minutely with reference to Figs. 4 and 5.

6 is a base-plate, here shown as circular, and fixed at its edges to this plate, so as to cover the same, is a thin metal diaphragm 7, capable of being pressed upward (or away from the base-plate) slightly at its middle part. In the base-plate, at or near its middle, is an air-port 8, which connects the space under the diaphragm with a closed air-holder 9, here shown as a metal cylinder. This air-holder serves to hold and incarcerate a suitable volume of air, which expands when the surrounding air becomes heated and acting on the back of the diaphragm 7 presses it outward at the center. Extending over the diaphragm 7 and fixed to the base-plate 6 at one end is a metal spring-blade 10, which has in it a screw or stud $10^a$, and the point of this screw is adapted to bear on the center of the diaphragm. Normally the free end of the spring 10 acts through a pin $10^b$, which extends down through the base-plate, to depress a contact-spring 11 into electrical contact with a binding post or screw $11^a$. When the fluid incarcerated in the chamber 9 is expanded by heat, the diaphragm 7 acts to move the spring 10 and by lifting the pin $10^b$ allows the contact-spring 11 to rise. The spring 10 rises into electrical contact with a binding-screw 12, insulated from the base-plate and spring 10. The contact of the spring 11 with the screw $11^a$ may be called the "closing" contact and the contact of the spring 10 with the screw 12 the "opening" contact.

The pin $10^b$ does not make electrical contact with either the base-plate 6 or the spring 11, and the said spring is insulated from its support $6^a$, which is on the under side of the base-plate.

Referring now to Fig. 1, G is a generator of electricity, from one pole of which a conductor $c$ leads to a binding-post $b$ of the motor A, and thence through the motor-magnet to a circuit closer and changer $a^3$ on the shaft $a$ of the motor. From the other pole of the generator a conductor $c'$ leads by branches to the respective like devices B and $B^\times$, through the coils of the electromagnets 4 thereat, and to the respective springs 10 of the thermostats T. From the binding-screw $b'$ of the motor A a branch conductor $c^2$ extends to the device B (for example) and connects with the spring 11 thereat, and the current may flow through this spring to the binding-screw $11^a$, thence by a conductor $c^2$ to the spring 11 at the device $B^\times$, through this spring to the binding-screw $11^a$ thereat, and thence by a conductor $c^2$ to the conductor $c'$ and the other pole of the generator, as shown. From a binding-post $b^2$ at the motor A branches of a conductor $c^3$ lead, respectively, to the binding-screw 12 at the devices B and $B^\times$. From the binding-post $b'$ (at the motor A) a conductor leads to a terminal brush $a^4$, which rests on the rotating circuit-changer $a^3$, and from the binding-post $b^2$ a conductor leads to a terminal brush $a^5$, which also rests on the circuit-changer $a^3$. In this circuit-changer are set, on diametrically opposite sides thereof, Fig. 5, insulating pieces or blocks, so that when the cock X is closed the brush $a^4$ will rest on one of these pieces, and the circuit through the motor will thus be broken. This is the normal condition and the condition seen in Fig. 1; but when a fire breaks out in the room where one of the sprinkling devices, as B, is situated and the temperature rises sufficiently to act on the thermostat T, connected therewith, the spring 10 will rise and allow the contact-spring 11 to break the circuit through the conductor $c^2$ and make connection at the binding-screw 12, thus completing the motor-circuit through the brush $a^5$. This will set the motor in motion. The crank $a'$ will make a half-rotation, opening the cock X, and then the circuit at brush $a^5$ will be broken by the opposite insulating-piece in the circuit-changer $a^3$ being brought under said brush. The other brush $a^4$ will now have metallic contact with the circuit-changer; but as the circuit through the conductor $c^2$ is still broken at the thermostat connected with the device B the motor will cease to rotate and the cock X will remain open until the room cools and the spring 10 of the thermostat again closes the circuit through the brush $a^4$, when the motor will make another half-revolution, thus closing the cock X.

It will be noted that when the circuit $c^3$ is closed at the thermostat the magnet 4 at that thermostat will be excited and will attract its armature, and consequently the valve 3 which closes that extinguishing-nozzle will be freed and allowed to open; but only the devices at that thermostat will be affected, the other nozzles remaining closed. For example, in the constructions illustrated in Fig. 1 when the thermostat T at the device B is heated by a fire the magnet 4 at this device only will be excited, as the thermostat governs, and the nozzle at $B^\times$ will not be opened. Hence water can escape only at the nozzle where that thermostat is situated which is affected by the heat, although both of the devices B and $B^\times$ are in circuit with the motor A and either thermostat may set said motor in operation. The valve 3 and its opening or releasing mechanism are designed to allow water to be admitted to the pipe $w$ under pressure without its escaping at any but the point or points where desired.

In order to measurably protect the magnet 4 and thermostat T from the water issuing from the nozzle 1, a bell-like shield or screen S may be employed. This screen is seen in section at B in Fig. 1.

In Fig. 1 two devices B and $B^\times$ are represented. These devices will be or may be identical, and there may be any number of such devices connected electrically with one motor and one generator.

It will be obvious that while it is convenient to connect the thermostat with the electromagnetic valve-releasing device at the nozzle 1, so that they may form one compact device, this is not absolutely essential to the operation of the invention; nor is it essential to the invention that the air-holder 9 of the thermostat shall have the form shown, so long as it incarcerates the air and fulfils its purpose. The thermostat described is very sensitive, and obviously it may be regulated so as to set the motor in motion at any degree of temperature required.

After a fire the valve 3 at the nozzle will be closed by hand and the armature-arm $5^a$ set under it to lock it. The connecting-rod $a^2$ may be detached from the crank-pin of the valve-lever $x$, so that the devices described will be inoperative. This might be desirable when a fire occurs during the day and the automatic device is not needed. It will be obvious, also, that a cut-off switch can be put in the electric circuit at a convenient point, so that when desired the circuit can be broken, so as to render the devices inoperative for the time. This is a matter within the knowledge of any electrician and need not be illustrated.

The specific construction of the thermostat T is not claimed herein independently of the other devices.

Having thus described my invention, I claim—

1. The combination with a water-service pipe having an outlet for the discharge of water for extinguishing fires, a cut-off cock in said service-pipe, and a valve closing said discharge-outlet, of an electric motor, as described, adapted to open and close said cut-off cock, a generator of electricity, an electromagnetic releasing device at the discharge-outlet to release the valve thereat when an electric current flows through the coil of said magnet of said device, an electric circuit including said generator and motor and having a normally-broken branch "opening" circuit through the coil of said magnet, and a normally-closed, branch "closing" circuit, and a thermostat at the discharging-point and adapted to break said closing-circuit and close the opening-circuit when the temperature rises above a predetermined point at said thermostat, whereby the motor is adapted to close the cut-off cock automatically when the thermostat completes the closing-circuit, substantially as set forth.

2. The combination with a water-service pipe having a plurality of outlets for the discharge of water for extinguishing fires, a cut-off cock in said service-pipe, and valves closing the several discharge-outlets, of an electric motor, as described, adapted to open and close said cut-off cock, a generator of electricity, an electromagnetic releasing device at each discharge-outlet to release the valve thereat when an electric current flows through the coil of the magnet of said device, an electric circuit including said generator and motor and having normally-broken, branch "opening" circuits through the coils of the respective magnets, and a normally-closed, branch "closing" circuit extending to and connecting the several discharging-points, and a thermostat at each discharging-point and adapted to break said closing-circuit and close the opening-circuit when the temperature rises above a predetermined point at said thermostat, whereby the motor is adapted to close the cut-off cock automatically when any thermostat completes the closing-circuit, substantially as set forth.

3. The combination with the outlet-nozzle 1, and the valve 3, closing said nozzle, of the electromagnet 4, situated below said valve with its axis horizontal, the armature 5, of said magnet having an arm 5ª which takes under said valve and holds it closed normally, a generator, a thermostat situated below the electromagnet and supported on the nozzle, a normally-open electric circuit including the coil of said magnet, and a circuit-closer controlled by said thermostat, whereby when the temperature rises the thermostat will complete the circuit through said magnet, substantially as set forth.

In witness whereof I have hereunto signed my name, this 11th day of January, 1899, in the presence of two subscribing witnesses.

JOSEPH BUTCHER.

Witnesses:
HENRY CONNETT,
PETER A. ROSS.